United States Patent [19]
Barmore, Jr. et al.

[11] Patent Number: 5,886,312
[45] Date of Patent: Mar. 23, 1999

[54] SWITCH LEVEL CONTROL FOR TANK ULLAGE DETERMINING SYSTEM

[75] Inventors: Gaston C. Barmore, Jr., Pearland, Tex.; Joseph C. Fiore, Aurora, Ill.; Norman A. Magiera, Sarasota, Fla.; Robert H. Dean, Evanston, Ill.; Jerzy Drazkowicz; Carl J. Campagna, both of Chicago, Ill.; Ralph G. Portis, Highland Park, Ill.

[73] Assignee: Midland Manufacturing Corp., Skokie, Ill.

[21] Appl. No.: 937,765

[22] Filed: Sep. 25, 1997

[51] Int. Cl.$^6$ .............................. H01H 35/18; G01F 23/56
[52] U.S. Cl. .......................... 200/84 C; 200/308; 73/313; 73/314; 73/319
[58] Field of Search .............................. 73/313, 314, 319, 73/DIG. 5, 305, 322; 116/321, 323, 324; 340/624; 200/84 R, 84 C, 308

[56] References Cited

U.S. PATENT DOCUMENTS

| | | | |
|---|---|---|---|
| 4,297,543 | 10/1981 | Shackcloth | 200/18 |
| 4,321,590 | 3/1982 | Ishikawa et al. | 340/515 |
| 4,384,184 | 5/1983 | Alvarez | 200/84 |
| 4,631,375 | 12/1986 | McCann | 200/84 C |
| 4,784,300 | 11/1988 | Lees | 222/453 |
| 4,805,066 | 2/1989 | Mergenthaler | 361/128 |
| 4,833,441 | 5/1989 | Okada et al. | 340/450 |
| 4,981,039 | 1/1991 | Hayashi et al. | 73/292 |
| 5,124,686 | 6/1992 | White et al. | 340/624 |
| 5,465,766 | 11/1995 | Siegele et al. | 141/198 |
| 5,532,673 | 7/1996 | Olson et al. | 200/84 R |

*Primary Examiner*—Michael L. Gellner
*Assistant Examiner*—Nhung Nguyen
*Attorney, Agent, or Firm*—Emrich & Dithmar

[57] ABSTRACT

A liquid level sensor for a tank includes coaxial inner and outer tubes having lower ends extending into the tank and upper ends projecting from the tank, with the upper end of the inner tube projecting from the outer tube and disposed a known distance from the top of the tank. A switch assembly includes a switch disposed in the inner tube and operable in response to proximity to a switch actuator which is carried by a float encircling the outer tube and movable therealong with the liquid level, the switch being connected across a pair of electrical conductors extending from the upper end of the inner tube. An indicator strip extends lengthwise of the conductors and is held thereagainst by a transparent sleeve, the strip having indicia indicating distance to the switch. Plastic cable ties extend through openings in the inner tube and snugly hold the switch assembly against the inner tube to permit manual axial movement of the switch assembly while preventing inadvertent movement thereof. The upper end of the inner tube is cut away to permit observation of alignment of the indicia with a reference mark on the inner tube. Plural tubes and switch assemblies with appropriate color coding may be provided.

23 Claims, 4 Drawing Sheets

SWITCH LEVEL CONTROL FOR TANK ULLAGE DETERMINING SYSTEM

BACKGROUND OF THE INVENTION

1. Field of the Invention

The present invention relates to systems for determining the ullage of a liquid-containing tank, and relates in particular to systems of the type utilizing switches actuated by float-carried switch actuators.

2. Description of the Prior Art

The present invention is an improvement of a commercially available tank ullage determining system which utilizes a pair of tubes extending into the tank and respectively encircled by floats carrying switch actuators. Disposed in each tube is a switch connected in an electrical cable which extends upwardly through the tube and out through an opening in a stopper. When the stopper is inserted in the upper end of the tube it clamps against the cable to hold it against axial movement. A manual float lifter is provided to manually raise the floats and test the operation of the switches, which are typically respectively set at different levels corresponding, for example, to a desired high level and an overfill level. In normal operation, the floats rise and fall with the liquid level and when a float moves past a switch it actuates the switch to signal the liquid level.

In this prior system, when it is desired to change the level of a switch, the stopper is removed to free the switch cable, which can then be manually pulled up or pushed down in the tube. The difficulty with this arrangement is that there is no way to readily and accurately determine the new switch level. In order to determine this level, the manual float lifter must be used to raise the floats to actuate the switch, the distance that the float must be manually raised serving as an indication of the new switch level.

SUMMARY OF THE INVENTION

It is a general object of the present invention to provide an improved tank liquid level sensor which avoids the disadvantages of prior sensors while affording additional structural and operating advantages.

An important feature of the invention is the provision of a sensor of the type set forth which permits simple and accurate adjustment of an alarm switch level.

In connection with the foregoing feature, a further feature of the invention is the provision of a sensor of the type set forth which permits a user to readily visually determine the distance of an alarm switch from the top of the tank.

A further feature of the invention is the provision of a sensor of the type set forth which is of simple and economical construction.

Certain ones of these and other features of the invention are attained by providing in a sensor for indicating the level of a liquid in a tank, including a tube having a lower end extending into the tank and an upper end protruding from the tank and disposed a known distance from the top of the tank, and a float carrying a switch actuator and encircling the tube and movable therealong as the liquid level in the tank rises and falls, the improvement comprising: a switch assembly disposed within the tube for movement axially thereof, the switch assembly including a pair of electrical conductors extending from the upper end of the tube and adapted to be coupled to an associated annunciator circuit, a switch connected across the conductors and disposed in the tube and operable in response to proximity to the switch actuator, and an indicator strip connected to the conductors and extending lengthwise thereof and having indicia thereon indicating distance to the switch, whereby the switch can be selectively positioned at a desired depth as indicated by the indicia by axial movement of the switch assembly within the tube.

Further features of the invention are attained by providing, in a sensor of the type described, wherein the tube is an inner tube disposed coaxially within an outer tube, and including a transparent sleeve encircling the conductors and the indicator strip and fixedly securing the strip to the conductors while permitting the indicia to be read by a user, and a retaining mechanism holding the switch assembly snugly against the inner tube so as to permit manual axial movement of the switch assembly while preventing inadvertent movement thereof relative to the inner tube, whereby the switch can be selectively positioned at a desired depth as indicated by the indicia by axial movement of the switch assembly within the inner tube.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
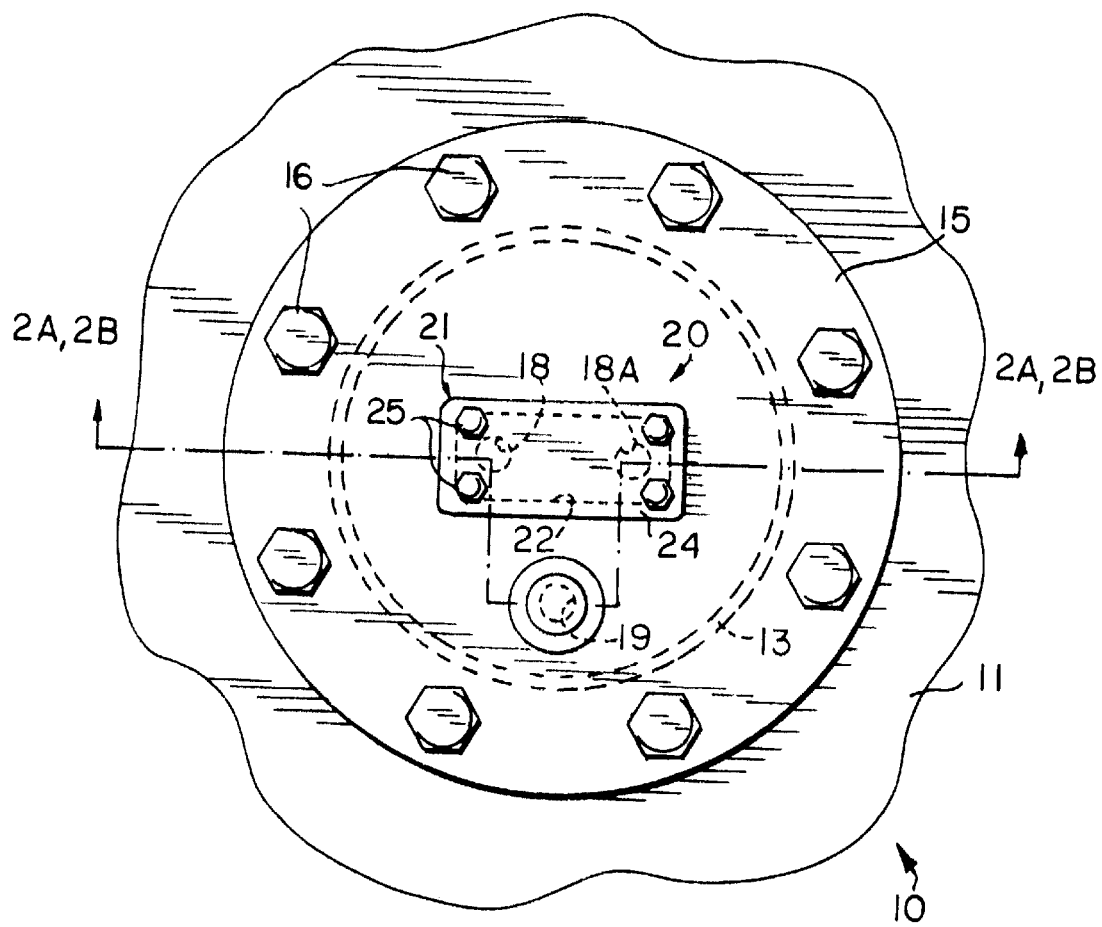
FIG. 1 is a fragmentary top plan view of a sensor assembly constructed in accordance with and incorporating the features of the present invention, as mounted on an associated tank.
Figure 2A:
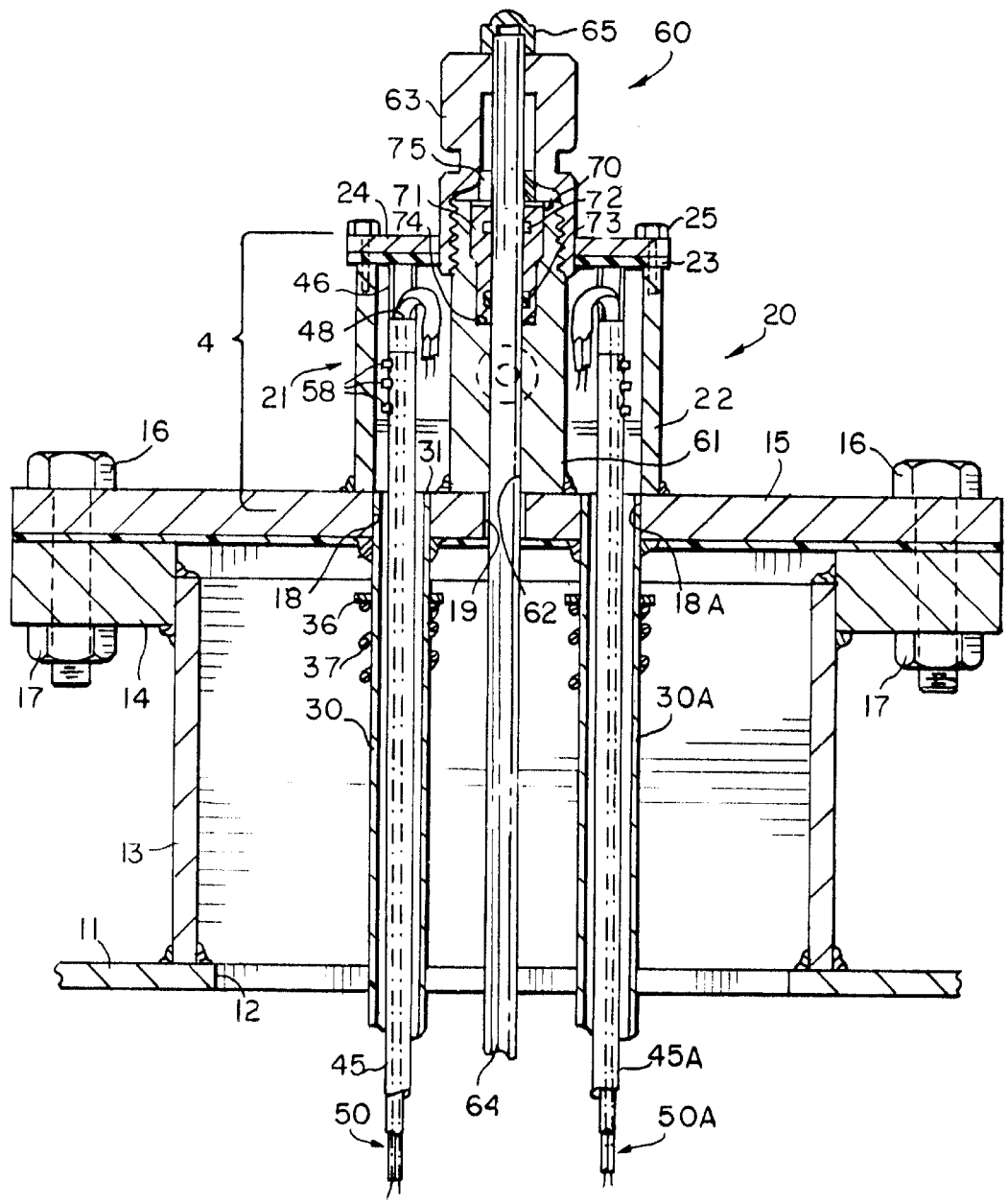
FIGS. 2A and 2B are, respectively, the upper and lower ends of an enlarged view in vertical section taken along the line 2A, 2B–2A, 2B in FIG. 1.

Referring to FIGS. 1 and 2A, the present invention is designed for use with a tank 10 having an upper wall 11 provided with an aperture 12 therein defining an access port to the interior of the tank. The tank 10 may be any of a number of different types of liquid storage tank, but will typically be a lading tank for a vehicle, such as a barge or the like. The aperture 12 is encircled by an upstanding cylindrical wall 13 which is fixed, as by welding, to the outer surface of the tank wall 11. Fixed, as by welding, to the upper end of the cylindrical wall 13 and extending laterally outwardly therefrom is an annular flange 14, which supports a circular cover plate 15 adapted to be fixedly secured to the flange 14, as by bolts 16 extending through complementary openings in the cover plate 15 and flange 14 and threadedly engaged with associated nuts 17. The cover plate 15 has formed therethrough a pair of circular sensor tube apertures 18 and 18A and a lift rod aperture 19, for purposes to be explained more fully below.

Referring also to FIGS. 2B–4, the present invention relates to a sensor assembly, generally designated by the numeral 20, for providing an indication of the level of liquid 80 in the tank 10. The sensor assembly 20 includes a housing 21 which is mounted on the cover plate 15 over the apertures 18 and 18A. The housing 21 has an upstanding, generally rectangular side wall 22 fixed to the cover plate 15, as by welding. The upper end of the side wall 22 is closed by a gasket 23 and a removable top wall 24, which is fixed in place by a plurality of screws 25, respectively threadedly engaged in bosses 26 at the corners of the side wall 22 (see FIG. 4). A circular exit opening 27 is formed in the rear of the side wall 22 (FIG. 4) for a purpose to be explained more fully below.

The sensor assembly 20 includes two outer tubes 30 and 30A, respectively having upper ends 31, 31A (FIG. 2A) received in the apertures 18 and 18A so as to be substantially flush with the upper surface of the cover plate 15 inside the housing side wall 22. The outer tubes 30, 30A are preferably fixed, as by welding, to the cover plate 15 and extend substantially vertically downwardly through the access port aperture 12 into the tank 10 a predetermined distance. The outer tubes 30, 30A are of identical construction, so that only tube 30 will be described in detail. It has a lower end 32 (FIG. 2B) closed by a plug 33 which is fixed, as by a screw 34, to one end of a connector bracket 35, the other end of which is similarly coupled to the other outer tube 30A. Fixed to the outer surface of the outer tube 30 just below the cover plate 15 is an annular collar 36, to which is fixed one end of a depending stop spring 37 which encircles the outer tube 30 for a purpose to be described below.

Figure 2B:
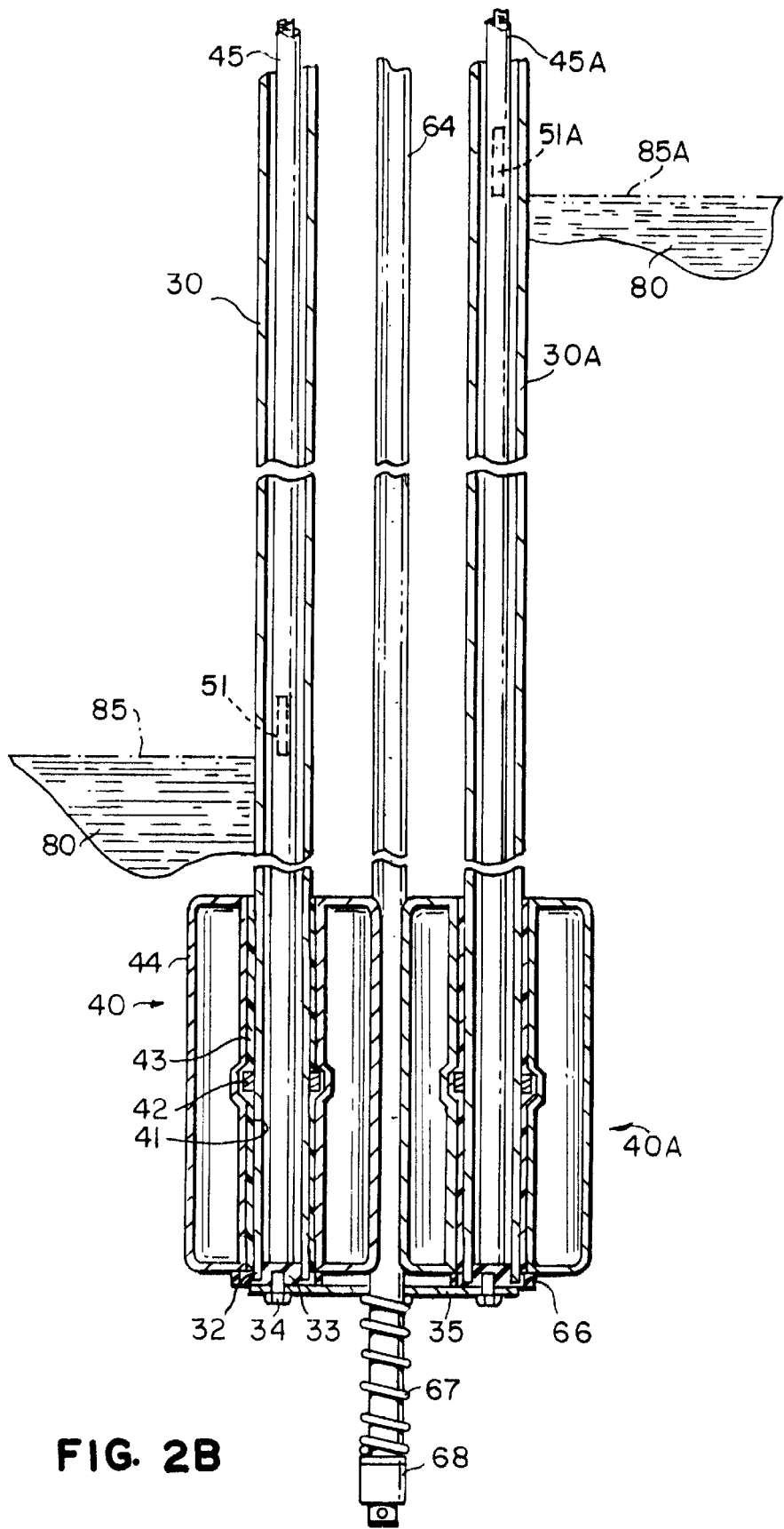

Referring in particular to FIG. 2B, the sensor assembly 20 includes two floats 40, 40A, respectively encircling the outer tubes 30, 30A for free sliding movement axially thereof so that the floats 40, 40A can rise and fall with the level of the liquid in the tank. The floats 40 and 40A are identically constructed, so that only the float 40 will be described in detail. The float 40 includes an elongated, cylindrical, hub tube 41 which loosely encircles the outer tube 30. A switch actuator in the form of an annular magnet 42 encircles the hub tube 41 substantially midway between is upper and lower ends and is secured in place by a retainer 43. An outer shell 44 is fixed, as by welding, to the upper and lower ends of the hub tube 41 and cooperates therewith to define therebetween an annular float chamber, which is preferably filled with air at atmospheric pressure.

Figure 3:
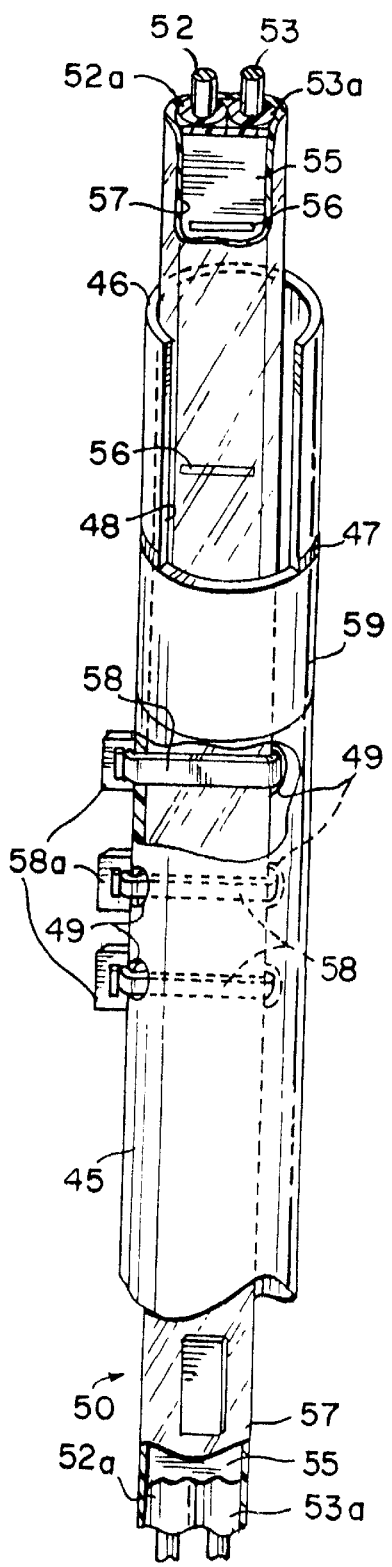
FIG. 3 is an enlarged, fragmentary, perspective view of one of the switch assemblies of the sensor of FIG. 2A, with portions broken away more clearly to show internal construction.
Figure 4:
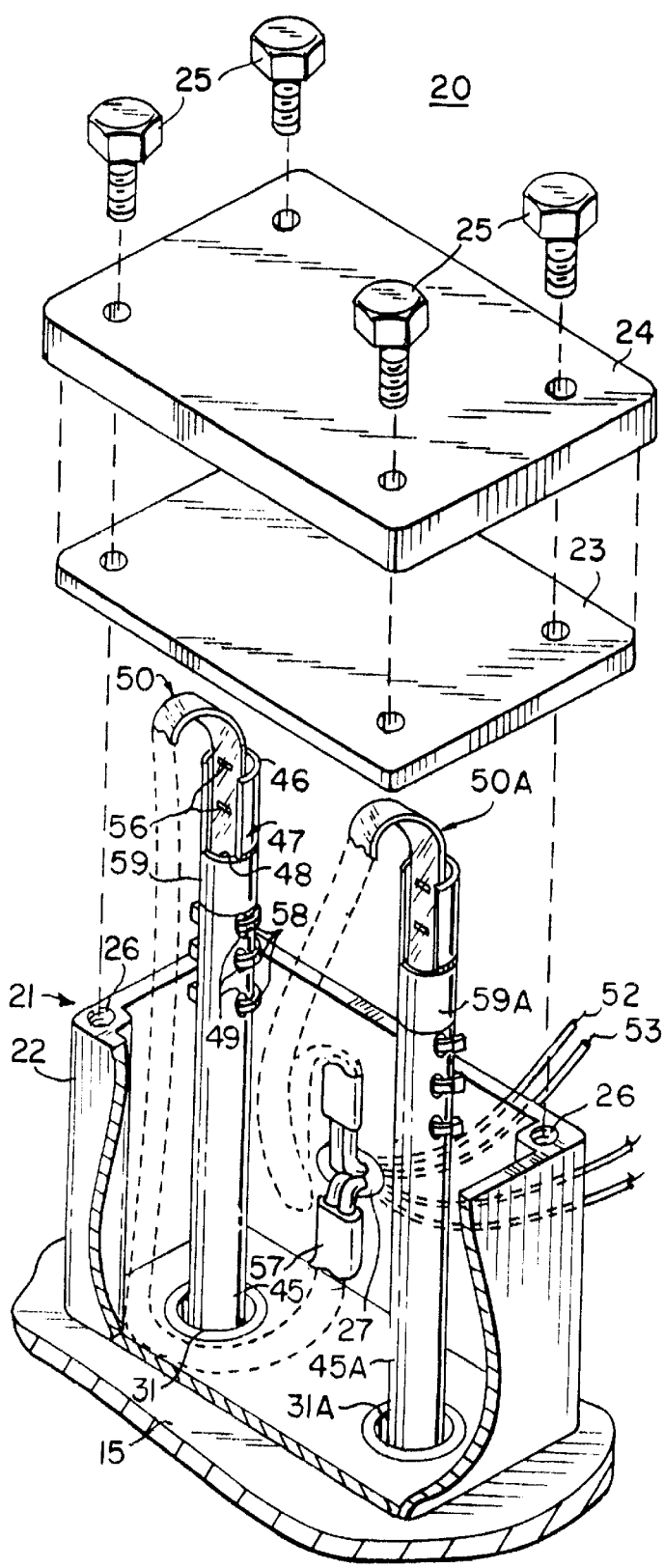
FIG. 4 is a further enlarged, perspective, exploded view of the portion of the switch assembly designated by the numeral 4 in FIG. 2A.

Respectively disposed inside the outer tubes 30 and 30A coaxially therewith are inner tubes 45, 45A, the lower ends of which are seated, in use, on the plugs 33. The inner tubes 45, 45A, which are of identical construction, have a length such that, when seated on the plugs 33, they project upwardly into the housing 21 with their upper ends 46 terminating substantially at the upper edge of the housing side wall 22 (see FIG. 2A). The inner tubes 45 and 45A are of identical construction, so that only the tube 45 will be described in detail. It is provided on its outer surface with a circumferential reference mark 47 a predetermined distance below the upper end 46, so that, in use, the reference mark 47 will be disposed a predetermined known distance below the top of the tank 10 (FIGS. 3, 4). The inner tube 45 is cut away along a portion of its circumference from the upper end 46 to the reference mark 47, as at 48, to facilitate reading of the sensor, as explained further below. Also formed through the tube 45 a predetermined distance below the reference mark 47 are three axially spaced-apart pairs of horizontally aligned holes 49, the holes of each pair preferably being aligned along a line which is parallel to but spaced from a diameter of the tube 45, so as to define a chord thereof.

Respectively disposed in the inner tubes 45, 45A are two switch assemblies 50, 50A, which respectively include switches 51, 51A which are preferably disposed in use at different vertical levels in the tank 10 and are preferably magnetically actuated. The switch assemblies 50 and 50A are of identical construction, so that only the switch assembly 50 will be described in detail. The switch 51 is connected across a pair of electrical conductors 52 and 53, which are respectively provided with suitable electrical insulation 52a and 53a and extend longitudinally of the inner tube 45 upwardly from the switch 50. The conductors 52 and 53 have a length substantially greater than the length of the inner tube 45, so that they can extend from the upper end 46 thereof into the housing 21 and thence out through the exit opening 27 for coupling to an associated annunciator circuit (not shown), which may be either proximally or remotely located.

The switch assembly 50 also includes an elongated indicator strip 55 in the nature of a flat, rectangular tape formed of any suitable material and extending lengthwise of the conductors 52 and 53 and having a width substantially equal to the combined diameters of the conductor insulators 52a and 53a. The indicator strip 55 is provided with a plurality of longitudinally spacedapart indicia 56, which are preferably equidistantly spaced apart and indicate the distance from the indicium to the switch 51. The indicator strip 55 is fixed to the conductors 52 and 53, preferably by means of an encompassing sleeve 57. More particularly, the sleeve 57 may be in the form of a plastic film which is shrink-wrapped around the conductors 52 and 53 and the indicator strip 55, firmly holding the conductors 52 and 53 together and the indicator strip 55 thereagainst. Preferably this shrink-wrap sleeve 57 extends at least the entire length of the indicator strip 55 and, therefor, is formed of a transparent material.

In use, the switch assembly 50 can be manually moved axially within the inner tube 45 to selectively change the position or level of the switch 51. However, once the switch 51 is positioned at the desired level, it is necessary to retain the switch assembly 50 against further movement, so that the switch level will not be inadvertently altered. For this purpose, there are provided a plurality of loop-type retaining members, preferably in the form of plastic cable ties 58, respectively provided with locking heads 58a, in a known manner, a variety of types of such cable ties being readily commercially available. Each cable tie 58 has its tongue end passed through a pair of the holes 49 in the inner tube 45 in front of the switch assembly 50 and then around the outside of the inner tube 45 and through the locking head 58a and tightened in place. In the illustrated embodiments three of the cable ties 58 are shown, but it will be appreciated that any number could be used. The holes 49 are so positioned that when the cable ties 58 are thus tightened in position the switch assembly 50 is held snugly enough against the inner surface of the inner tube 45 to prevent inadvertent movement of the switch assembly 50, but loosely enough to permit manual movement of the switch assembly 50 relative to the inner tube 45. Since, in the illustrated embodiment, two switch assemblies 50, 50A are provided, the inner tubes 45 and 45A, are respectively, provided with identifying markers, such as appropriately colored strips 59, 59A, wrapped around the outsides of the tubes 45, 45A.

In operation, when it is desired to change the level of the switch assembly 50, the top wall 24 and gasket 23 are removed from the housing 21 and the operator holds the inner tube 45 in place with one hand while manually raising or lowering the switch assembly 50 with the other hand. The cutaway 48 in the inner tube 45 permits the user to view registration of the indicator strip indicia 56 with the reference mark 47 (see FIG. 3) to directly read the distance from the reference mark 47 to the switch 51. It will be appreciated that the indicia 56 could be calibrated so as to directly indicate the distance of the switch 51 from the top of the tank 10. The slack length of the switch assembly 50 outside the inner tube 45 is accommodated within the housing 21. If desired, a take-up reel or the like (not shown) could be provided for the slack length of the switch assembly 50.

The two switch assemblies 50, 50A respectively indicate different levels in the tank 10, such as, for example, a high level 85 and an overfill level 85A (FIG. 2B). The buoyancy of the floats 40, 40A in the liquid 80 is preferably designed so that the magnet 42 floats substantially at the liquid level. Each switch 51, 51A is designed to be magnetically actuated in response to proximity to the associated magnet 42, so that the switch is actuated when the liquid level is substantially at the level of the switch. Each switch 51 is preferably normallyclosed to satisfy government regulations for ship or barge applications. When a switch is actuated it may trigger a suitable audible and/or visible alarm annunciator, all in a known manner.

The sensor assembly 20 is also proved with a manual lift assembly 60 for manually testing the switch assemblies 50, 50A. Referring to FIG. 2A, the lift assembly 60 includes a generally cylindrical body 61 fixed, as by welding, to the outer surface of the cover plate 15 and having an axial bore 62 therethrough disposed in alignment with the rod aperture 19 in the cover plate 15. A cap 63 is threadedly engageable with the upper end of the body 61 and has an axial bore therethrough which receives an elongated lift rod 64, which passes through the bore 62 of the body 61, through the rod aperture 19 in the cover plate 15 and into the tank to the lower end of the sensor assembly 20 (FIG. 2B). Preferably, the upper end of the lift rod 64 is fixed to a head 65 externally of the cap 63. The lower end of the rod 64 passes through an aperture in a lift plate 66, which extends beneath the floats 40, 40A and has openings therethrough for respectively freely receiving the outer tubes 30, 30A. The lift rod 64 extends below the lift plate 66 and is encircled by a helical spring 67, which is seated on a spring seat 68 fixed to the rod 64.

The body 61 is provided with a seal assembly 70 including a seal body 71 having an axial bore therethrough for receiving the rod 64 and provided with a pair of O-rings 72 and 73 sealingly engageable with the rod 64 and an O-ring 74 sealingly engageable with the body 61. A gasket 75 is disposed around the rod 64 against the inner side of the cap 63 for cooperation therewith to hold the seal body 71 firmly in place when the cap is threaded onto the body 61.

In operation, when it is desired to test the switches 51, 51A, the cap 63 is unscrewed and the lift rod 64 is raised, lifting the floats 40, 40A past the switches 51, 51A to see if they actuate the switches. It will be appreciated that the springs 37 serve as cushion stops to prevent damage to the floats 40, 40A if they are pulled up above the tank wall 11, while the spring 67 cushions the floats when they are returned to their original position.

While in the present invention two of the switch assemblies 50, 50A have been provided, it will be appreciated that any number could be used.

From the foregoing, it can be seen that there has been provided an improved sensor assembly for determining the liquid level in a tank, the assembly being of simple and economical construction and affording easy manual adjustment of the level sensors with directly visible reading of the depth of the sensor in the tank.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In a sensor for indicating the level of a liquid in a tank, including a tube having a lower end extending into the tank and an upper end protruding from the tank and disposed a known distance from the top of the tank, and a float carrying a switch actuator and encircling the tube and movable therealong as the liquid level in the tank rises and falls, the improvement comprising:

a switch assembly disposed within the tube for movement axially thereof, said switch assembly including a pair of electrical conductors extending from the upper end of the tube and adapted to be coupled to an associated annunciator circuit, a switch connected across said conductors and disposed in the tube and operable in response to proximity to the switch actuator, and an indicator strip connected to said conductors and extending lengthwise thereof and having indicia thereon indicating distance to the switch, whereby the switch can be selectively positioned at a desired depth as indicated by the indicia by axial movement of the switch assembly within the tube.

2. The sensor of claim 1, wherein each of said conductors is insulated.

3. The sensor of claim 2, wherein said indicator strip is in the form of an elongated tape, the conductors being arranged in side-by-side relationship with the tape spanning the conductors.

4. The sensor of claim 3, and further comprising a housing mounted on the outside of the tank and enclosing the upper end of the tube and dimensioned to accommodate slack lengths of conductors and indicator strip.

5. The sensor of claim 4, wherein said housing has an exit opening for said conductors.

6. The sensor of claim 1, and further comprising a sleeve encircling said conductors and said indicator strip and fixedly securing said strip to said conductors.

7. The sensor of claim 6, wherein said sleeve extends the length of said indicator strip and is substantially transparent to permit the indicia to be read by a user.

8. The sensor of claim 1, wherein the tube includes a reference mark spaced a predetermined short distance from the upper end thereof, said tube being cut away along a portion of the circumference thereof from said upper end to said reference mark to permit a user to view alignment of the strip indicia with the reference mark.

9. The sensor of claim 1, wherein the tube is a first tube, and further comprising a second tube parallel to and coextensive with the first tube, a second switch assembly disposed within the second tube for movement axially thereof, and different identifying markers respectively disposed on said first and second tubes for distinguishing therebetween.

10. In a sensor for indicating the level of liquid in a tank, including an outer tube having a lower end extending into the tank and an upper end projecting from the tank, a float carrying a switch actuator and encircling the outer tube and movable therealong as the liquid level in the tank rises and falls, and an inner tube disposed within the outer tube and having an upper end protruding from the outer tube and disposed a known distance from the top of the tank, the improvement comprising:

a switch assembly disposed within the inner tube for movement axially thereof, said switch assembly including a pair of electrical conductors extending from the upper end of the inner tube and adapted to be coupled to an associated annunciator circuit, a switch connected across said conductors and disposed in the inner tube and operable in response to proximity to the switch actuator, an indicator strip connected to said conductors and extending lengthwise thereof and having indicia thereon indicating distance to the switch, and a retaining mechanism holding said switch assembly snugly against said inner tube so as to permit manual axial movement of the switch assembly while preventing inadvertent movement thereof relative to the inner tube, whereby the switch can be selectively positioned at a desired depth as indicated by the indicia by axial movement of the switch assembly within the inner tube.

11. The sensor of claim 10, wherein said retaining mechanism includes a loop around the switch assembly and a portion of the inner tube.

12. The sensor of claim 11, wherein said inner tube has apertures therein for receiving said loop therethrough.

13. The sensor of claim 12, wherein said loop is in the form of a plastic cable tie including a locking head lockingly receiving a free end of the tie.

14. The sensor of claim 13, wherein said retaining mechanism includes a plurality of said cable ties spaced apart axially of the tube.

15. The sensor of claim 11, and further comprising a housing mounted on the tank and cooperating therewith to enclose the upper end of the inner tube and accommodating slack lengths of said conductors and said indicator strip.

16. The sensor of claim 15, wherein said housing has a removable top, the upper end of said inner tube being disposed against said top.

17. In a sensor for indicating the level of liquid in a tank, including an outer tube having a lower end extending into the tank and an upper end projecting from the tank, a float carrying a switch actuator and encircling the outer tube and movable therealong as the liquid level in the tank rises and falls, and an inner tube disposed within the outer tube and having an upper end protruding from the outer tube and disposed a known distance from the top of the tank, the improvement comprising:

a switch assembly disposed within the inner tube for movement axially thereof, said switch assembly including a pair of electrical conductors extending from the upper end of the inner tube and adapted to be coupled to an associated annunciator circuit, a switch connected across said conductors and disposed in the inner tube and operable in response to proximity to the switch actuator, an indicator strip connected to said conductors and extending lengthwise thereof and having indicia thereon indicating distance to the switch, a transparent sleeve encircling said conductors and said indicator strip and fixedly securing said strip to said conductors while permitting the indicia to be read by a user, and a retaining mechanism holding said switch assembly snugly against said inner tube so as to permit manual axial movement of the switch assembly while preventing inadvertent movement thereof relative to the inner tube, whereby the switch can be selectively positioned at a desired depth as indicated by the indicia by axial movement of the switch assembly within the inner tube.

18. The sensor of claim 17, wherein said sleeve is in the form of a plastic shrink wrap.

19. The sensor of claim 17, and further comprising a housing mounted on the tank and cooperating therewith to enclose the upper end of the inner tube and accommodating slack lengths of said conductors and said indicator strip.

20. The sensor of claim 19, wherein said housing has a removable top, the upper end of said inner tube being disposed against said top.

21. In a sensor for indicating the level of a liquid in a tank, including a tube having a lower end extending into the tank and an upper end protruding from the tank and disposed a known distance from the top of the tank, and a float carrying a switch actuator and encircling the tube and movable therealong as the liquid level in the tank rises and falls, the improvement comprising:

a switch assembly disposed within the tube for movement axially thereof, said switch assembly including at least one electrical conductor extending from the upper end of the tube and adapted to be coupled to an associated annunciator circuit, a switch connected to said at least one conductor and disposed in the tube and operable in response to proximity to the switch actuator, and indicia fixed relative to said at least one conductor for indicating distance to the switch, whereby the switch can be selectively positioned at a desired depth as indicated by the indicia by axial movement of the switch assembly within the tube.

22. The sensor of claim 21, wherein said at least one electrical conductor includes a pair of electrical conductors.

23. The sensor of claim 21, and further comprising an indicator strip connected to said conductors and extending lengthwise thereof and having said indicia thereon.

* * * * *